United States Patent [19]
Kahler

[11] 3,745,456
[45] July 10, 1973

[54] APPARATUS FOR TESTING ALTERNATORS AND VOLTAGE REGULATORS

[76] Inventor: Ronald D. Kahler, 11113 Carlile St., Northglenn, Colo. 80233

[22] Filed: Apr. 24, 1972

[21] Appl. No.: 246,559

[52] U.S. Cl. ............................................ 324/73 R
[51] Int. Cl. ............................................ G01r 15/12
[58] Field of Search ............................ 324/73 R, 51

[56] References Cited
UNITED STATES PATENTS

| | | | |
|---|---|---|---|
| 2,712,634 | 7/1955 | Briner | 324/73 R |
| 2,826,737 | 3/1958 | Crumbliss | 324/73 R X |
| 3,142,797 | 7/1964 | Grant | 324/73 R |
| 3,553,581 | 1/1971 | Tsergas et al. | 324/73 R |

*Primary Examiner*—Stanley T. Krawczewicz
*Attorney*—Mallinckrodt & Cornaby and Kay S. Cornaby

[57] ABSTRACT

An apparatus for testing alternators, voltage regulators and their component parts in an electrical system has a plurality of couplings adapted for connection to the output, field and auxiliary terminals of an alternator and to the field and armature terminals of a voltage regulator and to ground. The couplings are adapted to be connected with a voltage metering circuit and an amperage metering circuit through circuit means preferably including multiple contact switching means for connecting the various couplings with the metering circuits to conduct the desired test. In another embodiment, means is provided for testing the amperage draw by glow plugs in diesel engines.

10 Claims, 4 Drawing Figures

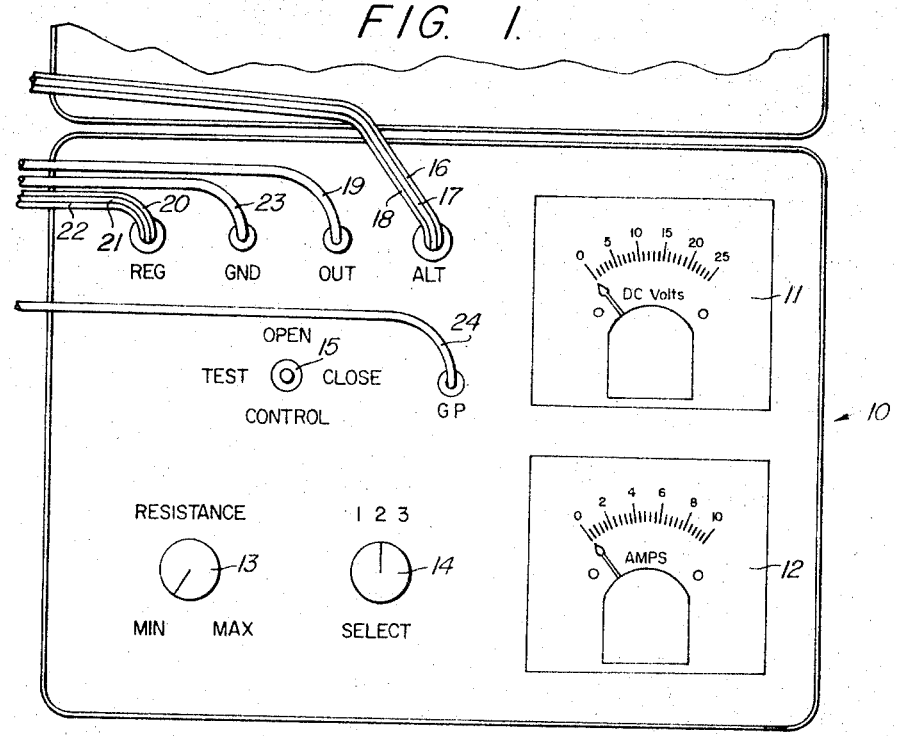
FIG. 1.
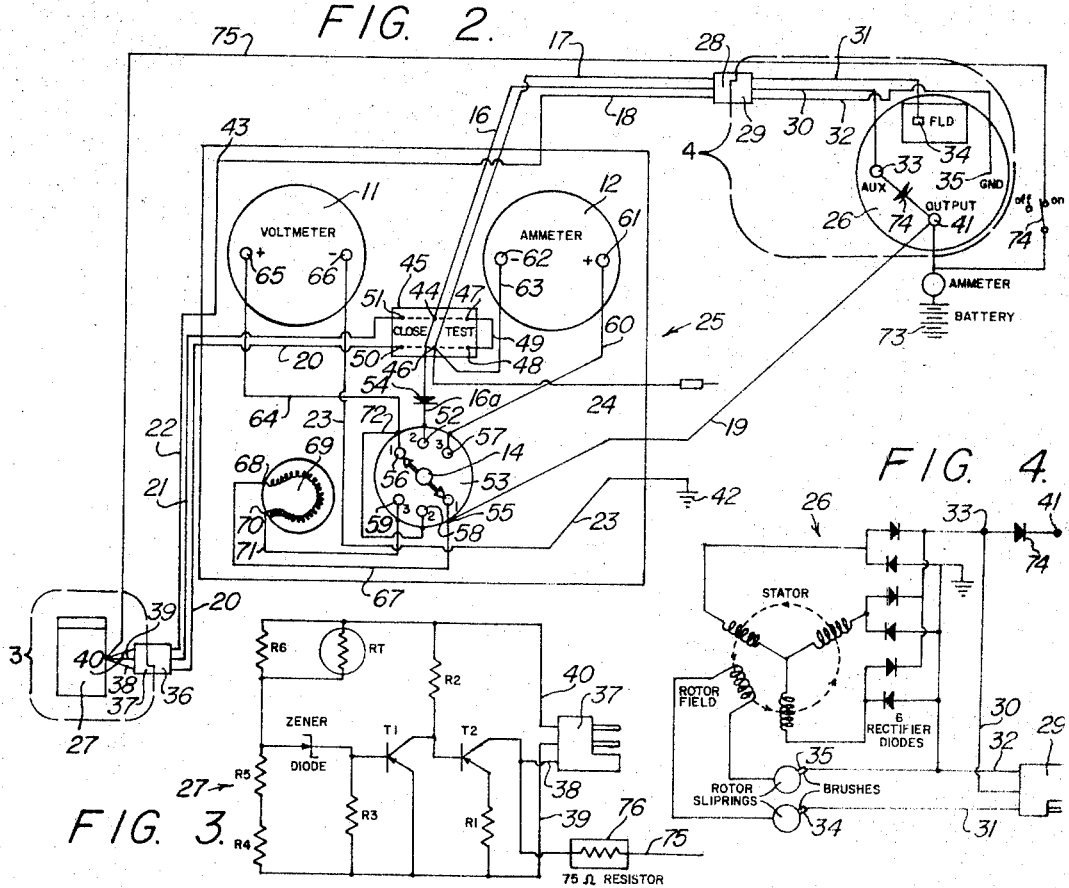
FIG. 2.
FIG. 4.
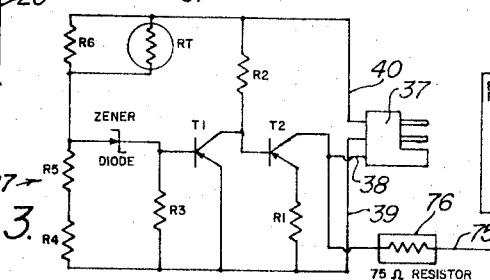
FIG. 3.

APPARATUS FOR TESTING ALTERNATORS AND VOLTAGE REGULATORS

BACKGROUND OF THE INVENTION

The invention relates to apparatus for testing components of electrical systems, and more particularly for testing voltage regulators, alternators and glow plugs in electrical systems.

The components of self-contained electrical systems, such as automotive or mobile refrigeration systems are sophisticated instruments containing many delicate parts such as transistorized voltage regulators and alternators, which can cease to function for a variety of reasons, and thereby cause the electrical system to break down completely or to operate at only partial capacity. Heretofore, it has been difficult and time-consuming to identify the cause of a system failure and to correct the problem, especially when repair has required removing the components and tearing them down for bench-testing at a shop location some distance away.

Several attempts have been made to devise an apparatus having the capacity to test the voltage regulators and generators of defective electrical systems and isolate the particular component which was malfunctioning. Such apparatuses as disclosed in U. S. Pat. No. 2,826,737 and U. S. Pat. No. 3,142,797 were intended to permit a mechanic to test the electrical systems in the field, but were unable to do more than identify which component in the system was faulty. The mechanic was then required to remove the defective component and examine it on the bench to determine what part within it was malfunctioning, or to replace the component completely. Both procedures were costly and time-consuming. The basic problem of isolating the malfunctioning component and the particular defective part within the component while in the field still remained unsolved until the present invention was made.

It was an objective in making the invention to provide a test apparatus for detecting the malfunctioning of components of an electrical system, specifically, the alternator, voltage regulator and glow plugs and to isolate the defective part within the component for rapid repair or replacement.

SUMMARY OF THE INVENTION

The test apparatus of the invention is adapted to be connected into an electrical system between the alternator and voltage regulator in the system. The apparatus has coupling means comprising first, second, third, fourth, fifth and sixth couplings, which can be standard electrical connectors respectively attached to one end of each of six electrical leads. The first three couplings are adapted to be connected respectively to the output, auxiliary, and field terminals of an alternator connected into a self-contained electrical system which includes a battery or similar source of electrical energy and drive means for rotating the rotor in the alternator. The fourth and fifth couplings are adapted to be connected respectively to the armature and field terminals of a voltage regulator connected in the electrical system. A sixth coupling is provided for connection to a ground.

The apparatus has a voltage metering circuit with means, such as a conventional voltmeter, for indicating the voltage drop across two points. First circuit means in the apparatus has connecting means for alternately connecting the voltage metering circuit respectively between the first and sixth couplings and between the second and sixth couplings. The first circuit means preferably comprises the first and second pairs of normally open contacts in a first multiple contact switch.

The second circuit means in the apparatus has connecting means for connecting an amperage metering circuit, for example an ammeter and variable resistance means, between the first and third couplings. In one embodiment, the connecting means comprises a third pair of normally open contacts in the first multiple contact switch described above.

Third circuit means in the apparatus has switching means for respectively interconnecting the third coupling with the fourth coupling, the second coupling with fifth coupling, and the second coupling with the third coupling. Preferably, the third and fourth couplings are interconnected simultaneously with the second and third couplings. In one embodiment, the third circuit means includes a second multiple contact switch having three pairs of normally open contacts for respectively interconnecting the third and fourth couplings, the second and fifth couplings and the second and third couplings.

Additional couplings can be incorporated into the apparatus for interconnecting the ground lead of an alternator with the ground lead of a voltage regulator through the apparatus. This can be especially advantageous for electrical systems in which the leads from the various alternator and voltage regulator terminals are encased in multiple-lead sleeves and terminate in plug-type connectors. A rectifier diode can be employed in the apparatus to prevent damage to the delicate diodes in the alternator caused by incorrect hook-up of the couplings. Such a diode permits current flow in only one direction.

An additional feature is the provision for still another coupling in the coupling means for connection with a glow plug in a diesel engine to determine the amperage draw of the glow plug. Within the apparatus the coupling is attached to one end of the amperage metering circuit, while the first coupling is attached to the other end of the metering circuit.

THE DRAWINGS

The best mode presently contemplated for carrying out the invention is illustrated in the accompanying drawings in which:

FIG. 1 is an illustration of the control panel of the test apparatus;

FIG. 2 is a schematic wiring diagram of the apparatus showing connection between a transistorized alternator and a transistorized voltage regulator;

FIG. 3 is an enlarged schematic wiring diagram of the transistorized voltage regulator shown in FIG. 2; and FIG. 4 is an enlarged schematic wiring diagram of the alternator shown in FIG. 3.

DETAILED DESCRIPTION OF THE ILLUSTRATED EMBODIMENT

The embodiment of the invention illustrated in the drawings is adapted for use in testing the components, i.e., the alternator and regulator, in the electrical system of a self-contained refrigeration unit of the type utilized for cooling refrigerated vans. With minor modifications, obvious to one skilled in the art, the described apparatus can be employed for testing the components of other self-contained electrical systems, such as automotive systems. By self-contained, it is meant to include systems having a rechargeable source of energy, such as a battery, and a drive source, e.g., internal combustion engine, for rotating the alternator rotor.

As shown in FIG. 1, a test apparatus of the type described herein has a control panel 10 displaying a voltmeter 11, having a capacity for indicating a voltage drop of from 0 – 25 volts, and an ammeter 12 having an indication range of from 0 – 10 amperes. A reostat 13 is included which is attached to a variable resistor described hereinbelow in connection with FIG. 2. The control panel 10 also has a selector knob 14 for selecting the desired contacts to be closed in a first switching means, and a manual control switch 15 for selecting the desired contacts of a second switching means, both described hereinbelow.

Electrical leads 16, 17 and 18 extend from the face of panel 10 and are adapted to be connected respectively with the auxiliary, field and ground terminals of an alternator in the refrigeration electrical system. For convenience, the three leads are bound together in a three-lead sleeve to facilitate attachment of the leads to the alternator couplings. A single lead 19 extends from the face of panel 10 and is adapted to be connected to the output terminal of the alternator. Three additional leads 20, 21, and 22 extend in a three-lead sleeve from panel 10 for connection respectively with the field armature, and ground terminals of the voltage regulator in the refrigeration electrical system. A ground lead 23 extends from panel 10 and is adapted to be connected to a ground external of the apparatus; and a glow plug lead 24 can be connected to a glow plug on a diesel engine, such as is often used with van-type refrigeration systems, to determine the amperage draw of the plug as indicated on ammeter 12.

A schematic wiring diagram of the preferred embodiment is depicted in FIG. 2, and shows the apparatus 25 connected through coupling leads 16, 17 and 18 to an alternator 26 (also shown in greater detail in FIG. 4) and through coupling leads 20, 21, and 22 to a voltage regulator 27 (shown in detail in FIG. 3) connected in the electrical circuitry of the refrigeration system.

In most refrigeration electrical systems the alternator and voltage regulator are connected together through electrical leads which are joined together with a pair of connector plugs at the respective ends of the leads. The connector plugs are so designed that proper connection of each of the three leads from the alternator is achieved with the corresponding leads from the voltage regulator. Apparatus 25 has coupling leads and adaptor plugs which are adapted to be connected between such an alternator and voltage regulator.

Coupling leads 16, 17 and 18 extend exteriorly of the apparatus to an adaptor plug 28 which is adapted to make proper connection with a connector plug 29 at the ends of three leads 30, 31, and 32 connected respectively to the auxiliary 33, field 34, and ground 35 terminals of alternator 26. Coupling leads 20, 21, and 22 also extend exteriorly of the apparatus to an adaptor plug 36 which is adapted to make appropriate connection with connector plug 37 attached to the end of leads 38, 39, 40. Leads 38, 39, 40 are connected respectively to the field, armature, and ground circuits within voltage regulator 27. Coupling lead 19 is adapted to be connected to the output terminal 41 of alternator 26, and ground coupling lead 23 has a connector at its outer end for attachment to an external ground 42.

Within apparatus 25, grounding leads 18 and 22 are attached together at interior terminal 43 to complete the grounding circuit between alternator 26 and voltage regulator 27. Coupling lead 16 is attached within the apparatus to a contact 44 in the second multiple contact switch 45. The interior terminal point for coupling lead 17 is contact 46 in switch 45. These two contacts 44 and 46 are paired respectively with contacts 47, 48 through a normally open switch position designated by "test" in switch 45. A lead 49 connects contact 47 with contact 48 so that when switch 45 is in the "test" position, both pairs of contacts 44, 47 and 46, 48 are closed and a closed circuit is formed between contacts 44 and 46. Coupling leads 20, 21 from voltage regulator 27 are terminated respectively at contacts 50, 51 of switch 45. Contacts 50 and 51 are paired respectively with contacts 44, 46 through a normally open switch position designated by "close" in switch 45, which simultaneously closes both contact pairs.

A lead 16a forms an extension of coupling lead 16 from contact 44 in switch 45 to a contact 52 in the first multiple contact switch 53. An isolation diode 54 is connected in lead 16a to ensure that a possible incorrect coupling of lead 16 resulting in a reversal of the current flow does not incapacitate the rectifier diodes in alternator 26. Coupling lead 19 is attached within the apparatus to contact 55 in switch 53. Contacts 56, 52 and 57 are paired respectively with contacts 55, 58, and 59 in normally open relationship in switch 53. Switch selector 14 is adapted to alternately close contact pairs 56 – 55 (illustrated in closed position), 52 – 58, and 57 – 59. Contact 57 is connected through lead 60 with the positive pole 61 of ammeter 12. The negative pole 62 of ammeter 12 is connected through lead 63 to contact 46 of switch 45. Contact 56 in switch 53 is connected through lead 64 with the positive terminal 65 of voltmeter 11. The negative terminal 66 of voltmeter 11 is connected through lead 23 to external ground 42.

Coupling lead 19, which is adapted for connection to the output terminal 41 of alternator 26, is attached within apparatus 25 to lead 67 at contact 55 of switch 53. Lead 67 is connected at one end to contact 55 and is attached at its other end to a terminal post 68 on a variable resistor 69. The resistance in resistor 69 is varied by manipulating reostat 13 located on the face of apparatus panel 10. The other terminal post 70 of resistor 69 is connected to switch contact 59 through lead 71. Switch contact 58 is connected to the positive terminal 65 of voltmeter 11 through lead 72, which is attached to lead 64 at contact 56.

Glow plug coupling lead 24 is attached within apparatus 25 to the negative terminal 62 of ammeter 12 through lead 63 with a point of attachment at contact 46 of switch 45. In this manner, an electrical circuit is formed from the glow plug (not shown) through ammeter 12, contacts 57 and 59 of switch 53, variable resistor 69, and leads 67 and 19 to alternator output terminal 41. This circuit can be utilized to determine the amperage flow through the glow plug; and in this manner, the effectiveness of the glow plugs in a diesel engine can be measured.

The other circuits in the apparatus can be employed to determine not only which of the major components in the electrical system are malfunctioning, but can also establish which part within the component is faulty and in need of repair or replacement. For example, the connections from alternator output terminal 41 (which draws power from storage battery 73) through lead 19, contacts 55 and 56 of switch 53 (position No. 1) voltmeter 11, and lead 23 to ground 42 provides a circuit between battery 73 and ground 42 to indicate battery voltage. Another circuit can be used to determine whether the isolation diode 74 between the output terminal 41 and auxiliary terminal 33 of alternator 26 (shown in both FIGS. 2 and 4) is shorted. The preferred circuit for this purpose is formed by connecting auxiliary terminal 33 through leads 16 and 16a to contacts 52 and 58 of switch 53 (position No. 2), and then through leads 72 and 64 to voltmeter 11. From voltmeter 11 the circuit runs through lead 23 to ground 42. Voltmeter should read "0" or diode is shorted.

Another test is conducted with the refrigeration unit engine (not shown) in operation using the circuitry described above in connection with the battery voltage check and with switch 45 in "test" position. A no voltage reading indicates defective rectifier diodes or stator in the alternator.

Still another test can be performed to determine malfunctioning in the field circuit of the alternator and voltage regulator. With the refrigeration engine in operation, and external unit switch 74 in the "on" position, current flows through lead 75 from battery 73 through switch 74 and a 75-ohm resistor 76 to lead 30 of voltage regulator 27 (as shown in FIG. 3). From lead 38 the current flows through contacts 50 and 46 in switch 45 (in closed position) and through lead 17 to field terminal 34 on alternator 26.

The ammeter circuitry is utilized to check the amperage draw of the brushes and rotor in alternator 26 (shown in FIG. 4). Current flows from the alternator 26 through output terminal 41 and leads 19 and 67 to variable resistor 69. From resistor 69, current flows through lead 71 to contact 59 of switch 53. With switch 53 in position No. 3, current then flows to contact 57 and through lead 60 to ammeter 12, and from there through leads 63 and 17 to field therminal 34 and the brushes and rotor in the alternator 26.

An additional test can be conducted utilizing circuitry starting with auxiliary terminal 33 and extending through lead 16 to contact 44 of switch 45. With switch 45 in the "test" position, current flows through contact 47, lead 49 and contact 48 to contact 46. From contact 46, the current flows through lead 17 to the field terminal 34 and the brushes and rotor of the alternator to induce a charge. Other tests can be performed using the circuitry provided in the apparatus, as will be apparent to one skilled in the art.

Whereas this invention is here illustrated and described with respect to a certain preferred form thereof, it is to be understood that many variations are possible without departing from the inventive concepts particularly pointed out in the claims.

I claim:

1. Apparatus for testing voltage regulators and alternators in an electrical system, comprising:

coupling means comprising first, second, third, fourth, fifth, and sixth couplings adapted for connection respectively to the output, auxiliary, and field terminals of an alternator, and the armature and field terminals of a voltage regulator, and to a ground;

a voltage metering circuit having means for indicating voltage;

a first circuit means including means for alternately connecting said voltage metering circuit respectively between said first and sixth couplings and between said second and sixth couplings;

an amperage metering circuit having means for indicating amperage;

a second circuit means including means for connecting said amperage metering circuit between said first and third couplings; and a third circuit means including means for interconnecting said third coupling with the fourth coupling, means for interconnecting said second coupling with the fifth coupling, and means for interconnecting said second coupling with the third coupling.

2. Apparatus as set forth in claim 1, wherein a rectifier diode is connected in said first circuit means between said second coupling and the voltage metering circuit.

3. Apparatus as set forth in claim 1, wherein said first circuit means includes first and second pairs of normally open contacts in a first multiple contact switching means for connecting said voltage metering circuit respectively between said first and sixth couplings and between said first and sixth couplings and between said second and sixth couplings; and said second circuit means includes a third pair of normally open contacts in said first multiple contact switching means for connecting said amperage metering circuit between said first and third couplings.

4. Apparatus as set forth in claim 1, wherein said third circuit means includes first, second and third pairs of normally open contacts in a second multiple contact switching means for interconnecting respectively said third and fourth couplings, said second and fifth couplings, and said second and third couplings.

5. Apparatus as set forth in claim 1, including a seventh coupling adapted for connection to the ground terminal of an alternator and an eighth coupling adapted for connection to the ground terminal of a voltage regulator, and means for attaching said seventh and eighth couplings to a common ground.

6. Apparatus as set forth in claim 5, wherein the second, third and seventh couplings are provided with connector plugs for connection with cooperating connecting plugs attached to leads from corresponding terminals of an alternator; and similar connector plugs are provided for the fourth, fifth, and eighth couplings for connection with cooperating connector plugs attached to leads from corresponding terminals of a voltage regulator.

7. Apparatus as set forth in claim 1, wherein said amperage metering circuit includes variable resistance means.

8. Apparatus as set forth in claim 7, wherein a ninth coupling is provided for connection to a glow plug in a diesel engine, said ninth and first couplings being attached to respective opposite ends of said amperage metering circuit.

9. Apparatus as set forth in claim 1, wherein said means for connecting the third and fourth couplings and said means for connecting the second and fifth couplings are adapted to function simultaneously with each other in the third circuit means.

10. Apparatus as set forth in claim 1, wherein said voltage metering circuit includes a voltmeter capable of measuring voltages from 0 to 25 volts, and said amperage metering circuit includes an ammeter capable of measuring amperages from 0 to 10 amperes.

* * * * *